Sept. 7, 1965 W. F. LINDSAY 3,205,357

SOLID STATE RADIATION DETECTOR

Filed April 18, 1962

INVENTOR.
WILLIAM F. LINDSAY

BY

Roland A. [signature]

ATTORNEY

United States Patent Office 3,205,357

Patented Sept. 7, 1965

3,205,357

SOLID STATE RADIATION DETECTOR

William F. Lindsay, Santa Barbara, Calif., assignor to the United States of America as represented by the United States Atomic Energy Commission Filed Apr. 18, 1962, Ser. No. 188,593

7 Claims. (Cl. 250—83.3)

Figure 1:
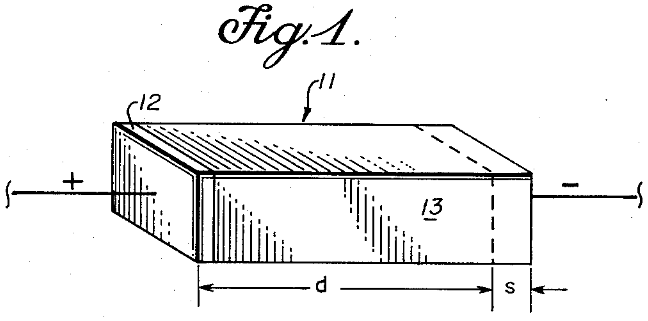

The present invention relates to solid state radiation detectors and, more particularly, to a solid state radiation detector capable of measuring slow to fast transient high intensity radiation flux including nuclear particles and electromagnetic radiation.

Reverse biased semiconductor junction diodes are now commonly used for the detection of single particle radiation. However, due to the thinness of the depletion regions, i.e., charge free volumes, and the signal-to-noise ratio of these detectors, they have not been advantageously used in the measurement of radiation fluxes. In addition, the response time of the present solid state detectors is comparatively slow and, hence, they have not been useful for the measurement or detection of fast transient radiation.

To measure high intensity, fast transient nuclear particle or electromagnetic radiation fluxes, it has been necessary to rely on relatively large vacuum tube detectors and, for better sensitivities, these tube detectors in combination with a luminescent material. The many advantages that would result from being able to replace these cumbersome tubes with a small solid state detector will be readily apparent to those skilled in the art. For instance, besides minimizing cost and handling procedures, a small solid state detector could be used as a point detector for studying asymmetrical flux distributions in the vicinity of a fast transient, high intensity radiation flux. Two or three dimensional matrix orientations of such a device could provide broad area or volume point detection of such radiation. Because of their small size and low weight, they would also be very useful for radiation flux measurements in space.

The present invention is a solid state detector capable of measuring fast transient, high intensity radiation flux, including that of small particle and electromagnetic radiation. Generally, the radiation detector of the present invention comprises a high resistivity, step junction semiconductor diode having a thin, heavily doped surface or "base" region, in combination with means for applying a reverse bias to the diode sufficient to minimize or entirely remove the neutral region of the diode. A luminescent material, e.g., a scintillating fluor, may be used with the present invention for increased sensitivity.

As mentioned before, solid state detectors as used now rely on a relatively thin depletion region. However, it has been found that a detector in which the diode depletion region extends substantially the whole width of the semiconductor crystal wafer has a very fast response time and is able to measure radiation fluxes of both nuclear particles and electromagnetic radiation. In order to have such a wide depletion region, the diode must have certain characteristics which will be discussed infra and must have a relatively strong reverse biasing potential applied to it. A diode having such a wide depletion region has a much greater junction volume to measure radiation fluxes. In addition, there is essentially no neutral region in the diode, which, as will be discussed infra, greatly enhances the response time of the detector.

It is therefore an object of the present invention to provide a solid state radiation detector capable of measuring highly intense nuclear particle and electromagnetic radiation fluxes.

It is another object of the present invention to provide a solid state radiation detector having a very fast response time.

A further object of the present invention is to provide a solid state photodiode radiation detector in which the neutral region of the diode is minimized.

Figure 2:
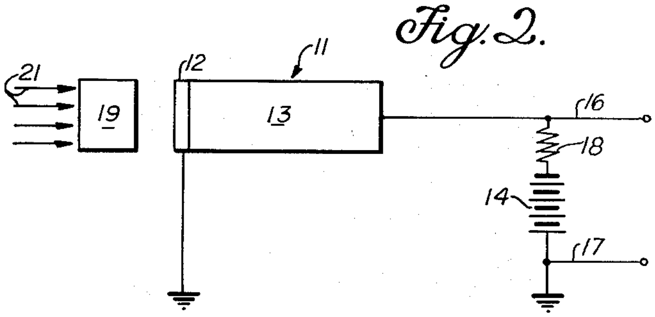

Other objects, advantages, and uses of the present invention will be apparent to those skilled in the art upon a consideration of the following description with reference to the attached drawings, in which:

FIGURE 1 is a schematic perspective representation of a solid state junction diode having the necessary characteristics to measure radiation fluxes including nuclear particle and electromagnetic radiation; and FIGURE 2 is an electrical schematic view of the radiation detector of the present invention.

Referring now to FIG. 1, there is shown a solid state step junction diode 11 constructed of a very thin heavily dope layer of n-type impurity 12 diffused with a step junction into one surface of a p-type silicon crystal 13. The resistivity of the crystal 13 where no n-type impurity has been added should be high, preferably above 1000 ohm-cm. The diode is reversely biased, i.e., with the polarity shown, by a potential source having a magnitude dependent on the resistivity and dimensions of the crystal in order to establish a depletion region having a width $d$ as shown.

While depletion regions having widths equal to the width of the crystal have been established, thus entirely eliminating the neutral region, this is not necessary for many uses of the invention. However, it must be remembered that the response time of the detector is inversely proportional to the neutral region width $s$. This may be explained by the fact that current carriers travel with a low velocity due to diffusion in a neutral region, while in a depletion region they travel with a much higher drift velocity due to the applied electric field. For measuring fast transient radiation then, e.g., having a pulse width of $10^{-7}$ to $10^{-9}$ seconds, this neutral region should be less than a few microns in order to attain linear sensitivity response.

The width of the depletion region should be optimized for each specific application with the requirements for detector pulse width response and type of radiation to be measured. Keeping in mind that an increase in $d$ increases the maximum current carrier transit time in the depletion region, the width of the depletion region should be sufficient to absorb a reasonable portion of the impinging radiation flux. For example, to measure 2 mev. gamma radiation having a pulse width of $10^{-8}$ sec., the depletion region width $d$ should be in the 10 to 1000 micron range.

In FIG. 2, a solid state junction diode 11 having characteristics determined by the criteria set forth above is shown electrically connected in series to a battery 14. The polarity of this connection is as shown to reversely bias the diode 11. The magnitude of the applied voltage is sufficient to establish a depletion region over substantially the whole width of crystal 13. An oscilloscope (not shown) is electrically connected by leads 16 and 17 across load resistance 18.

Since the sensitivity of most semiconductor materials varies with the wavelength of the radiation incident thereon, for optimum sensitivity a luminous material such as a scintillation fluor 19 may be used to transduce the incident radiation from its original wavelength to that which gives the best sensitivity. For instance, if it is desired to measure gamma radiation with a silicon detector, a fluor, such as one of polystyrene loaded with a wave shifter such as the dye Rhodamine B which will emit radiation approaching 10,000 angstroms is preferred.

In the operation of this preferred embodiment, the radiation flux of interest, depicted generally as 21 in FIG. 2, is incident on the fluor 19 which emits radiation of the appropriate wavelength and of an intensity proportional to the intensity of the incident radiation. This emitted radiation impinges on the crystal 13 and imparts energy to the lattice structure thereof which gives rise to electron hole pairs. These electron hole pairs are free to migrate and are rapidly drawn to the edges of the depletion region by the strong electric field established by the biasing potential. The traveling electrons and their associated holes create a current which is proportional to the radiation impinging on the crystal. This generated current causes a voltage drop across the load resistance 18. The voltage drop is introduced through leads 16 and 17 to an oscilloscope for the purpose of visualizing the intensity and pulse width of the incident flux.

In one use of the invention, it was desired to measure gamma radiation in the 1 to 5 mev. range. The diode used was a high resistivity (500 ohm-cm.) silicon crystal, 5 mm. by 5 mm. in area and 1 mm. thick, heavily doped on one surface with phosphorus. The reverse biasing potential had a magnitude of 100 volts. Thus, the depletion layer established was 220 microns in width while the neutral region was 500 microns wide. This detector showed linear response sensitivity for pulse widths down to $2\times10^{-8}$ seconds and had a sensitivity of $1.5\times10^{-17}$ amperes per gamma mev./cm.$^2$ sec. of incident radiation. When a scintillating fluor of polystyrene loaded with Rhodamine B dye was used with this diode, the sensitivity was increased to $4\times10^{-17}$ amperes per gamma mev./cm.$^2$ sec. of incident radiation.

With detectors of this invention, currents have been developed over the dynamic range of $10^{-7}$ amperes to amperes in pulsed gamma radiation fields of 10 roentgen/sec. to greater than $10^8$ roentgens/sec. for incident flux pulse widths of from D.C. to $10^{-9}$ seconds duration.

It should be noted that although in the preferred embodiment the thin heavily doped layer was designated as being diffused with an n-type impurity, a p-type could also be used. Besides a silicon crystal, the other commonly used semiconductors, including germanium and gallium antimonide, could also be used. Thus, while this invention has been described with respect to a preferred embodiment, it is to be understood that the same is by way of illustration and example only and is not to be considered a limitation. The spirit and scope of this invention is only limited by the attached claims.

What is claimed is:

1. A solid state radiation detector, especially adapted to accurately measure fast transient pulses of gamma radiation flux comprising a semiconductor junction diode, said junction diode having a high resistivity and a thin, heavily doped base region, a voltage potential means electrically connected to said junction diode in reverse biasing relationship, the voltage potential thereof being at least of a value sufficiently high to substantially eliminate the neutral region of said diode.

2. The detector of claim 1 wherein said base region is heavily doped with an n-type impurity.

3. The detector of claim 1 wherein said semiconductor diode is a crystal selected from the group consisting of silicon, germanium, and gallium antimonide.

4. A solid state radiation detector, especially adapted to accurately measure fast transient pulses of gamma radiation flux comprising a p-type silicon crystal wafer, said wafer having a high sensitivity and a thin base region heavily doped with an n-type impurity to form a step p-n junction diode, and voltage potential means electrically connected to said junction diode in reverse biasing relationship, the voltage potential thereof being of at least a value sufficiently high to substantially eliminate the neutral region of said diode.

5. The detector of claim 4 wherein said silicon wafer has a resistivity of 5000 ohm-cm. and said reverse biasing voltage potential means has a potential of 100 volts.

6. A solid state radiation detector, especially adapted to accurately measure fast transient pulses of gamma radiation flux comprising a p-type silicon crystal wafer, said wafer having a resistivity of at least 1000 ohm-cm. and a thin base region heavily doped with phosphorus to form a p-n step junction diode, and voltage potential means electrically connected to said junction diode in reverse biasing relationship, the voltage potential thereof being of at least a value sufficiently high to substantially eliminate the neutral region of said diode.

7. The detector of claim 6 further provided with means for shifting the wavelength of the radiation to be detected to about 10,000 angstroms before said radiation impinges on said step junction diode.

References Cited by the Examiner

UNITED STATES PATENTS

| | | | |
|---|---|---|---|
| 2,839,678 | 6/58 | De Witz | 250—83.3 |
| 2,991,366 | 7/61 | Salzberg | 250—83.3 |
| 3,043,955 | 7/62 | Friedland | 250—83.3 |
| 3,126,483 | 3/64 | Hoalst | 250—83.3 |
| 3,131,305 | 4/64 | Shombert | 250—83.3 |

RALPH G. NILSON, *Primary Examiner.*